(12) United States Patent
Hasegawa

(10) Patent No.: US 12,020,509 B2
(45) Date of Patent: Jun. 25, 2024

(54) MODEL PARAMETER LEARNING METHOD AND MOVEMENT MODE PARAMETER DETERMINATION METHOD

(71) Applicant: HONDA MOTOR CO., LTD., Tokyo (JP)

(72) Inventor: Yuji Hasegawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 319 days.

(21) Appl. No.: 17/463,145

(22) Filed: Aug. 31, 2021

(65) Prior Publication Data

US 2022/0076004 A1    Mar. 10, 2022

(30) Foreign Application Priority Data

Sep. 7, 2020 (JP) .................. 2020-149979

(51) Int. Cl.
*G06F 18/214*   (2023.01)
*G06N 3/04*     (2023.01)
*G06N 3/084*    (2023.01)
*G06V 40/20*    (2022.01)

(52) U.S. Cl.
CPC ............ *G06V 40/23* (2022.01); *G06F 18/214* (2023.01); *G06N 3/04* (2013.01); *G06N 3/084* (2013.01); *G06V 2201/07* (2022.01)

(58) Field of Classification Search
None
See application file for complete search history.

(56) References Cited

U.S. PATENT DOCUMENTS

| 2020/0074266 | A1* | 3/2020 | Peake ................ G06T 7/246 |
| 2020/0142421 | A1  | 5/2020 | Palanisamy et al. |
| 2020/0342652 | A1* | 10/2020 | Rowell .............. G06V 10/82 |
| 2021/0276595 | A1* | 9/2021 | Casas ................ G06V 10/82 |

FOREIGN PATENT DOCUMENTS

| WO | 2020/023731 | 1/2020 |
| WO | 2020/136978 | 7/2020 |

OTHER PUBLICATIONS

Extended European Search Report dated Jan. 21, 2022, Application No. 21188881.3, 8 pages.

* cited by examiner

*Primary Examiner* — Oneal R Mistry
(74) *Attorney, Agent, or Firm* — Rankin, Hill & Clark LLP

(57) ABSTRACT

In a learning method, a time series of a movement direction when a reference pedestrian M1 moves to a destination multiple times, a time series of a mask image indicating a positional relationship of nearby pedestrians M2 in a movement direction of the reference pedestrian M1, and a time series of an environment information image 35 are acquired, learning data is created by associating these time series with each other, and a model parameter of a CNN 33a is learned by a back propagation method using the learning data.

3 Claims, 12 Drawing Sheets

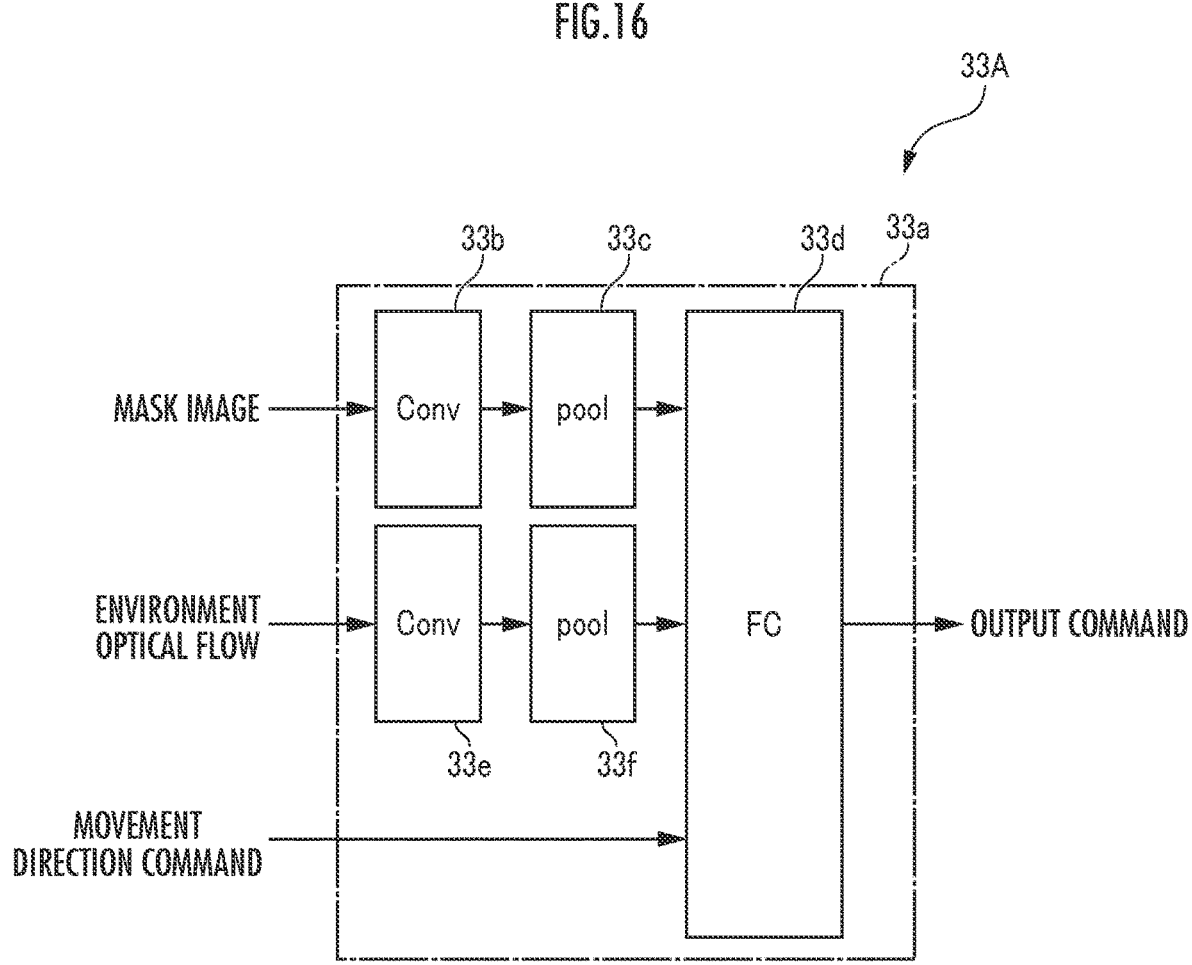

MODEL PARAMETER LEARNING METHOD AND MOVEMENT MODE PARAMETER DETERMINATION METHOD

BACKGROUND

Technical Field

The present invention relates to a model parameter learning method of a movement mode model in a moving device, and the like.

Related Art

Conventionally, as a model parameter learning method, a method described in WO 2020/136978 A has already been proposed by the present applicant. In the model parameter learning method, a model parameter of a CNN is learned, and the CNN is for determining a movement direction of a robot when the robot moves in a crowd in a facility such as a shopping mall.

In the model parameter learning method, a movement trajectory when a pedestrian as a reference (hereinafter, referred to as a "reference pedestrian") actually walks in a crowd and a movement trajectory of a pedestrian around the reference pedestrian (hereinafter, referred to as a "nearby pedestrian") are acquired using a LIDAR or the like. Next, a mask image for learning is created by virtually reproducing the movement trajectory of the reference pedestrian and the movement trajectory of the nearby pedestrian under a gazebo environment. Then, the model parameter of the CNN is learned using the mask image for learning as an input.

SUMMARY

According to the model parameter learning method of WO 2020/136978 A, since the mask image used for learning the model parameter of the CNN is created using the movement trajectory of the reference pedestrian actually walking in the crowd and the movement trajectory of the nearby pedestrian, there is a problem that the arrangement of a stationary object (structure) such as a wall is not considered in the learning of the model parameter of the CNN. This problem also occurs when a moving device other than the robot is used, when a movement mode model other than the CNN is used, or when a movement mode parameter other than the movement direction is used.

The present invention has been made to solve the above problems, and an object of the present invention is to provide a model parameter learning method and the like capable of efficiently and appropriately learning a model parameter of a movement mode model used when a moving device moves in an environment where a plurality of moving objects and a stationary object are present around the moving device.

The invention according to a first aspect is a model parameter learning method in which a learning device learns a model parameter of a movement mode model for determining a movement mode parameter representing a movement mode when a moving device moves from a departure point to a destination under a condition that a plurality of moving objects are present around the moving device, the model parameter learning method performed by the learning device, including: a movement mode parameter acquisition step of acquiring a time series of the movement mode parameter of a first moving object when the first moving object moves from the departure point to the destination while avoiding interference with each of a plurality of second moving objects under a condition that the plurality of second moving objects are present around the first moving object; a positional relationship information acquisition step of acquiring a time series of positional relationship information indicating a positional relationship of the plurality of second moving objects in a movement direction of the first moving object when the first moving object moves from the departure point to the destination; an environment information acquisition step of acquiring a time series of environment information which is information indicating an extension state of a stationary object around the first moving object when the first moving object moves from the departure point to the destination; a learning data creation step of creating learning data by associating the time series of the movement mode parameter, the time series of the positional relationship information synchronized with the time series of the movement mode parameter, and the time series of the environment information synchronized with the time series of the movement mode parameter with each other; and a learning step of learning the model parameter of the movement mode model, which outputs the movement mode parameter, by a predetermined machine learning algorithm using the learning data as an input to the movement mode model.

According to the model parameter learning method, the learning data is created by associating the time series of the movement mode parameter, the time series of the positional relationship information synchronized with the time series of the movement mode parameter, and the time series of the environment information synchronized with the time series of the movement mode parameter with each other, and the model parameter of the movement mode model, which outputs the movement mode parameter, is learned by the predetermined machine learning algorithm using the learning data as an input to the movement mode model.

In this case, since the time series of the movement mode parameter, the time series of the positional relationship information, and the time series of the environment information are all acquired when the first moving object moves from the departure point to the destination, the model parameter of the movement mode model can be learned while reflecting the extension state of the stationary object positioned around the first moving object by learning the model parameter of the movement mode model using these time series. Therefore, when the moving device moves from the departure point to the destination in an environment where a crowd and a stationary object such as a structure are present, in a case where the movement mode model after learning is used, the movement mode parameter can be determined so that interference with the moving object and the stationary object present around the moving device can be avoided.

The invention according to a second aspect is the model parameter learning method according to the first aspect, in which in the environment information acquisition step, the environment information is acquired as information on a two-dimensional map.

According to the model parameter learning method, since the environment information is acquired as the information on the two-dimensional map, the two-dimensional map can be used when the movement mode parameter is determined using the movement mode model after learning.

The invention according to a third aspect is the model parameter learning method according to the first aspect, in which in the environment information acquisition step, the environment information is acquired as an optical flow.

According to the model parameter learning method, since the environment information is acquired as the optical flow, an image in a traveling direction of the moving device can be used when the movement mode parameter is determined using the movement mode model after learning.

A movement mode parameter determination method according to a fourth aspect includes determining, by a movement mode parameter determination device, a movement mode parameter of a moving device by using a movement mode model of which a model parameter is learned by the model parameter learning method according to any one of the first to third aspects.

According to the movement mode parameter determination method, since the movement mode parameter of the moving device is determined using the movement mode model of which the model parameter is learned as described above, it is possible to determine the movement mode parameter so that interference with a moving object and a stationary object present around the moving device can be avoided even in a case where the moving device moves to the destination in an environment where the moving object and the stationary object are present.

BRIEF DESCRIPTION OF DRAWINGS

FIG. 16 is a diagram illustrating a functional configuration of a CNN learning unit according to a second embodiment.

DETAILED DESCRIPTION

Hereinafter, a model parameter learning method according to a first embodiment of the present invention will be described. In the model parameter learning method of the present embodiment, a model parameter of a convolutional neural network (CNN) to be described later as a movement mode model is learned, and this CNN is used when a movement trajectory of a robot 2 (see FIG. 1) as a moving device is determined.

Figure 1:
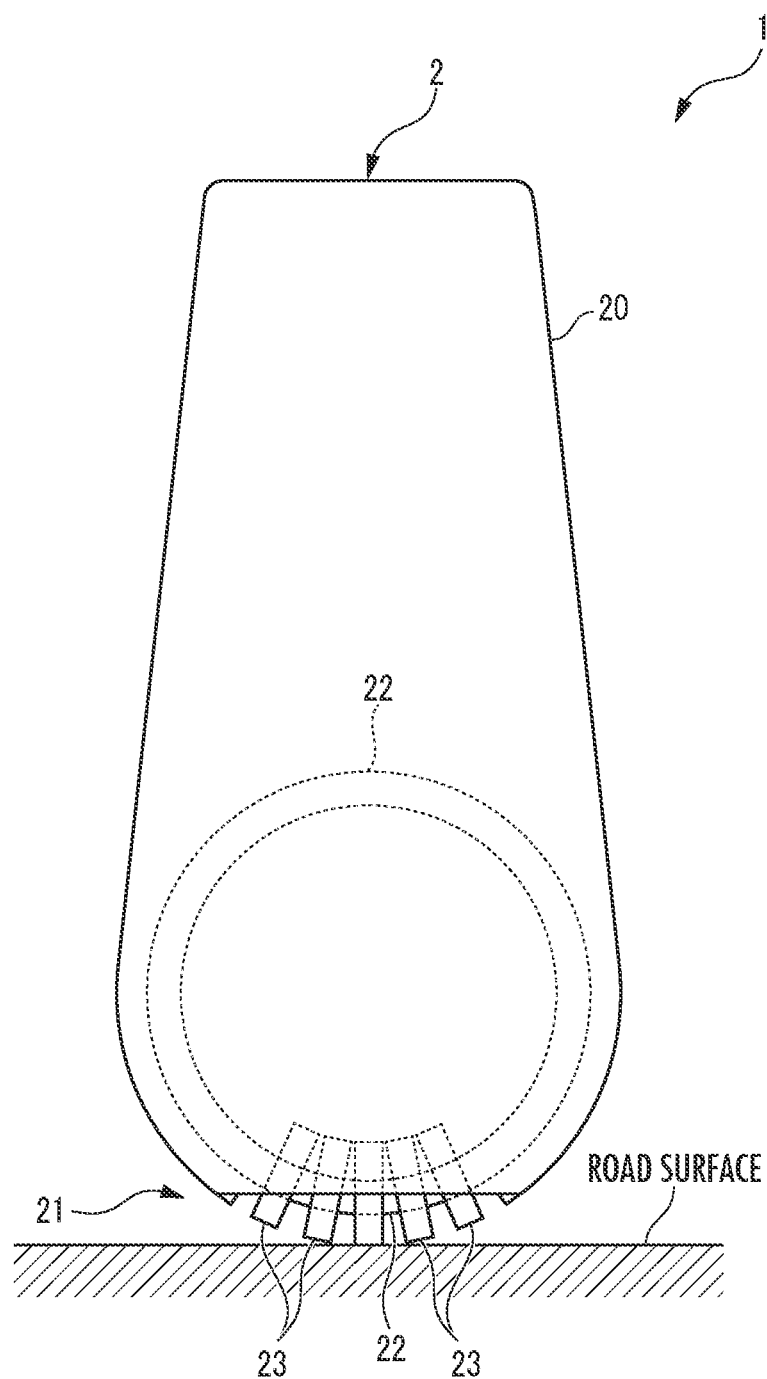
FIG. 1 is a view illustrating an appearance of a robot to which a model parameter learning method according to a first embodiment of the present invention is applied.

First, a trajectory determination device 1 illustrated in FIG. 1 will be described. The trajectory determination device 1 is applied to the inverted pendulum type robot 2, and determines the movement trajectory of the robot 2 under a condition where a probability of presence of traffic participants such as a crowd is high by a method to be described later. Note that, in the present embodiment, the trajectory determination device 1 corresponds to a movement mode parameter determination device.

Figure 2:
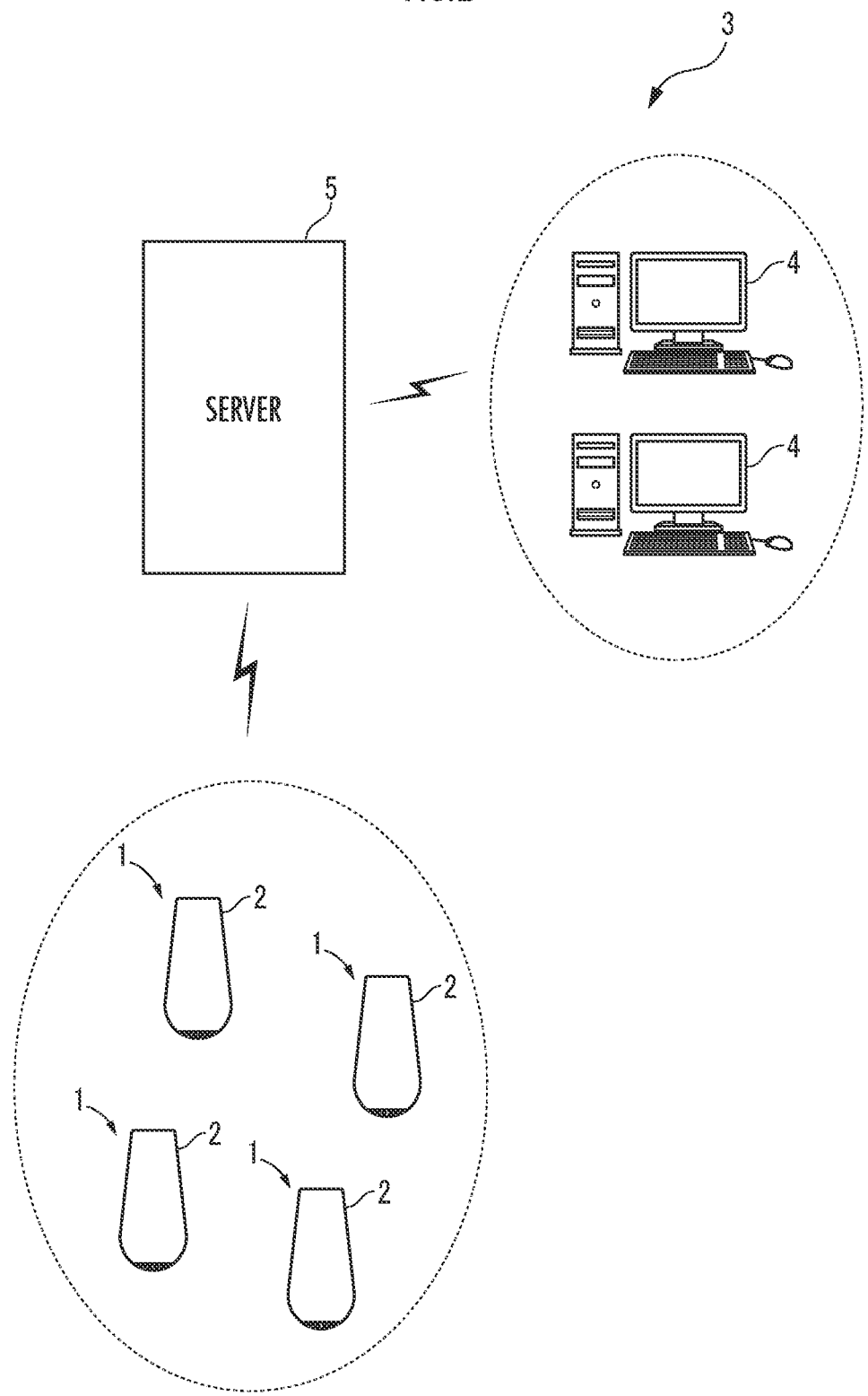
FIG. 2 is a diagram illustrating a configuration of a guidance system using the robot.

The robot 2 is of an autonomous movement type and is used in a guidance system 3 illustrated in FIG. 2. The guidance system 3 is of a type in which the robot 2 guides a user to a destination (for example, a store or a boarding gate) while leading the user in a shopping mall, an airport, or the like.

As illustrated in FIG. 2, the guidance system 3 includes a plurality of robots 2 that autonomously move in a predetermined region, an input device 4 which is provided separately from the plurality of robots 2 and to which the destination of the user is input, and a server 5 that can wirelessly communicate with the robots 2 and the input device 4.

The input device 4 is of a personal computer type, and when the destination of the user is input by the user (or an operator) operating a mouse and a keyboard, the input device 4 transmits a wireless signal indicating the destination to the server 5. Once the wireless signal is received from the input device 4, the server 5 sets, as a destination Po, the destination itself of the user or a relay point to the destination based on internal map data, and transmits a destination signal indicating the destination Po to the robot 2.

As will be described later, when the destination signal is received from the server 5 via a wireless communication device 14, a control device 10 in the robot 2 reads the destination Po included in the destination signal and determines a movement trajectory from a departure point Ps to the destination Po. In addition, the control device 10 acquires the position of the robot 2 on map data (see FIG. 8) by wireless communication with the server 5.

Next, a mechanical configuration of the robot 2 will be described. As illustrated in FIG. 1, the robot 2 includes a main body 20, a movement mechanism 21 provided in a lower portion of the main body 20, and the like, and is configured to be movable in all directions on a road surface by the movement mechanism 21.

Specifically, the movement mechanism 21 is configured similarly to that of JP 2017-56763 A, for example, and thus a detailed description thereof is omitted here. The movement mechanism 21 includes an annular core body 22, a plurality of rollers 23, a first actuator 24 (see FIG. 3), a second actuator 25 (see FIG. 3), and the like.

The plurality of rollers 23 are fitted onto the core body 22 so as to be arranged at equal angular intervals in a circumferential direction (around an axis) of the core body 22, and each of the plurality of rollers 23 is rotatable integrally with the core body 22 around the axis of the core body 22. Each of the rollers 23 is rotatable around a central axis (an axis in a tangential direction of a circumference having the axis of the core body 22 as the center) of a cross section of the core body 22 at an arrangement position of each of the rollers 23.

Furthermore, the first actuator 24 is implemented by an electric motor, and when a control input signal to be described later is input from the control device 10, the first actuator 24 rotates the core body 22 around the axis of the core body 22 via a drive mechanism (not illustrated).

On the other hand, similarly to the first actuator 24, the second actuator 25 is also implemented by an electric motor, and when a control input signal is input from the control device 10, the second actuator 25 rotates the roller 23 around the axis of the roller 23 via a drive mechanism (not illustrated). Accordingly, the main body 20 is driven by the first actuator 24 and the second actuator 25 so as to move in all directions on the road surface. With the above configuration, the robot 2 can move in all directions on the road surface.

Figure 3:
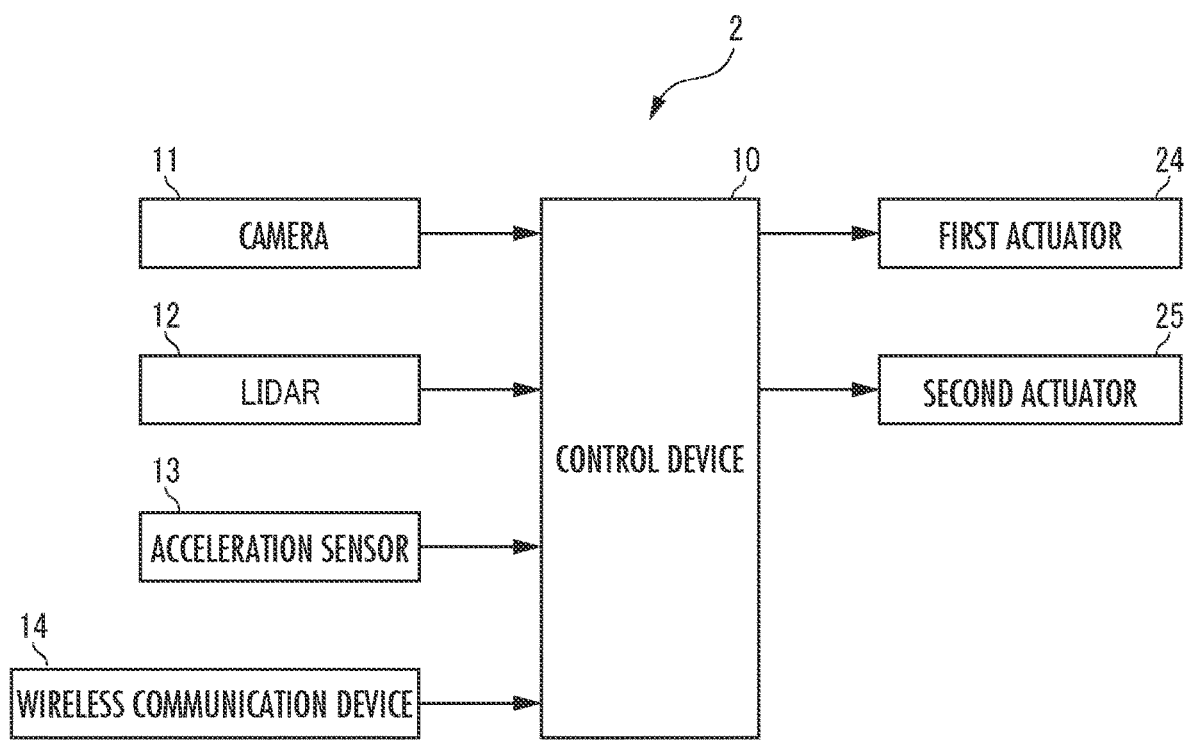
FIG. 3 is a block diagram illustrating an electrical configuration of the robot.

Next, an electrical configuration of the robot 2 will be described. As illustrated in FIG. 3, the robot 2 further includes the control device 10, a camera 11, a LIDAR 12, an acceleration sensor 13, and the wireless communication device 14.

The control device 10 is implemented by a microcomputer including a CPU, a RAM, a ROM, an E2PROM, an I/O interface, various electric circuits (not illustrated), and the like. In the E2PROM, map data of a location in which the robot 2 perform guiding and the convolutional neural network (CNN) are stored. In this case, as the CNN, a CNN of which model parameters, that is, a weight of a connected layer and a bias term, have been sufficiently learned by a learning device 30 to be described later is stored.

The camera 11 captures an image of a surrounding environment of the robot 2 and outputs an image signal indicating the image to the control device 10. In addition, the LIDAR 12 measures, for example, a distance to an object in the surrounding environment by using laser light, and outputs a measurement signal indicating the distance to the control device 10. Further, the acceleration sensor 13 detects the acceleration of the robot 2 and outputs a detection signal indicating the acceleration to the control device 10.

The control device 10 estimates a self-position of the robot 2 by an adaptive Monte Carlo localization (amlc) method by using the image signal of the camera 11 and the measurement signal of the LIDAR 12 described above. In addition, the control device 10 calculates an x-axis speed v_x and a y-axis speed v_y of the robot 2, which will be described later, based on the measurement signal of the LIDAR 12 and the detection signal of the acceleration sensor 13.

Furthermore, the wireless communication device 14 is electrically connected to the control device 10, and the control device 10 performs wireless communication with the server 5 via the wireless communication device 14.

Next, a configuration of the trajectory determination device 1 of the present embodiment and a principle of a trajectory determination method will be described. First, the learning device 30 illustrated in FIG. 4 will be described. The learning device 30 is for learning the model parameters (the weight of the connected layer and the bias term) of the CNN to be described later, and includes a LIDAR 31, a learning data creation unit 32, and a CNN learning unit 33. Specifically, these elements 32 to 33 are implemented by a computer (not illustrated) or the like.

Figure 4:
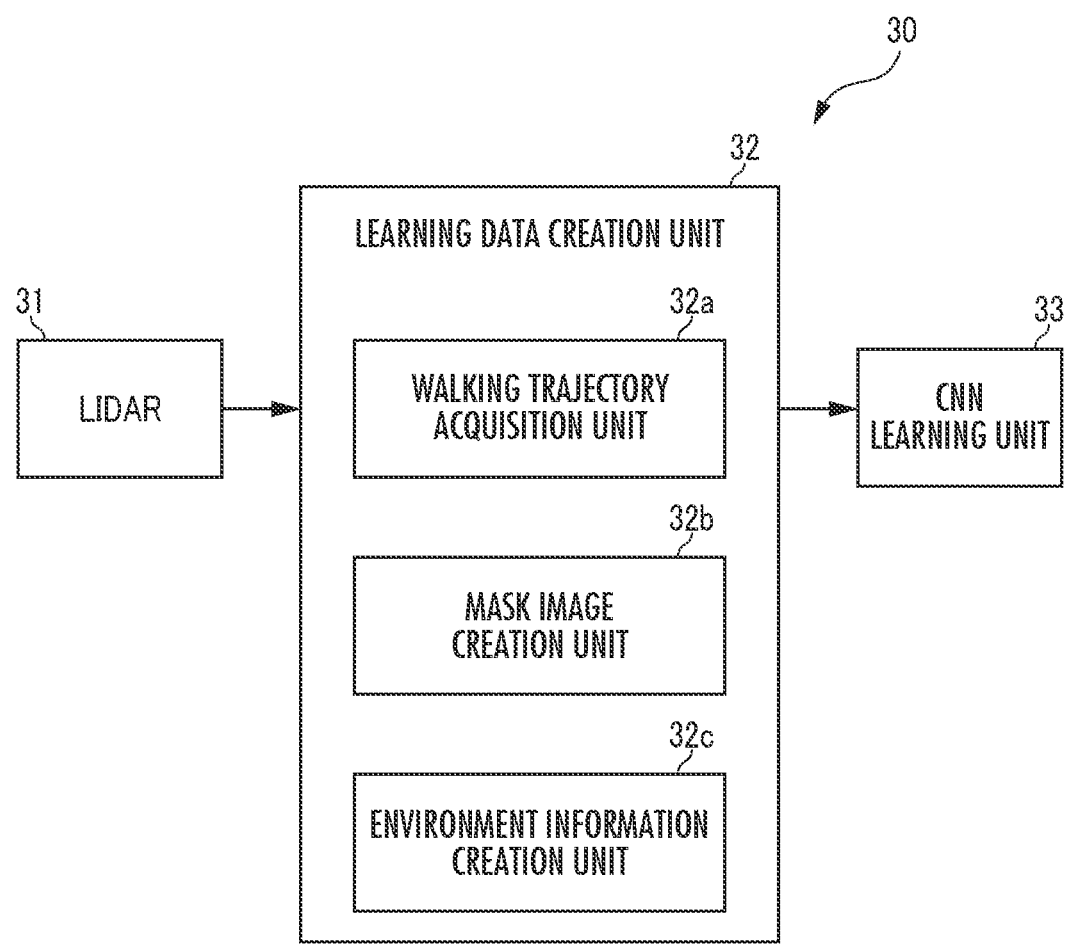
FIG. 4 is a block diagram illustrating a functional configuration of a learning device.

As described below, the learning data creation unit 32 creates learning data based on the measurement result of the LIDAR 31, and includes a walking trajectory acquisition unit 32a, a mask image creation unit 32b, and an environment information creation unit 32c as illustrated in FIG. 4. The walking trajectory acquisition unit 32a sequentially acquires a walking trajectory of a pedestrian at a predetermined control interval as described below based on the measurement result of the LIDAR 31 in order to learn the walking trajectory of the pedestrian.

Figure 5:
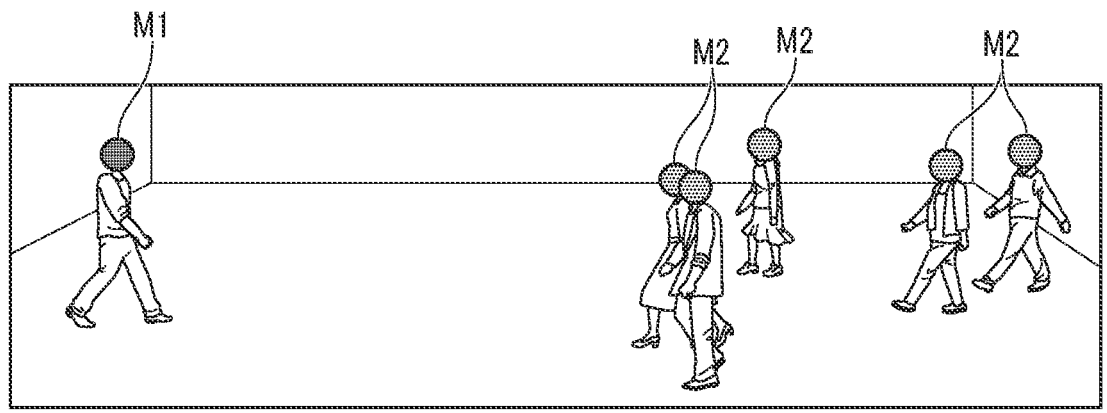
FIG. 5 is a perspective view when a walking trajectory of a reference pedestrian is acquired.

For example, as illustrated in FIG. 5, in a crowded traffic environment in which a reference pedestrian M1 is set as a pedestrian who becomes a reference, and a plurality of pedestrians (hereinafter, referred to as "nearby pedestrians") M2 are present in an irregular arrangement in a moving direction of the reference pedestrian M1, the LIDAR 31 measures a change of the position of the reference pedestrian M1 when the reference pedestrian M1 actually walks from a walking start point Ps (see FIG. 6) to the destination Po (see FIG. 6), and changes of the positions of the plurality of nearby pedestrians M2. Note that, in the present embodiment, the reference pedestrian M1 corresponds to a first moving object, and the nearby pedestrian M2 corresponds to a second moving object.

The measurement is performed when the reference pedestrian M1 walks from the walking start point Ps to the destination Po multiple times, and the measurement results are input from the LIDAR 31 to the walking trajectory acquisition unit 32a. In this case, the reference pedestrian M1 does not need to be the same person, and for example, a plurality of different pedestrians may walk from the walking start point Ps to the destination Po once or more. In this case, changes of the positions of these pedestrians and the changes of the positions of the plurality of nearby pedestrians M2 may be measured by the LIDAR 31, and the measurement results may be input to the walking trajectory acquisition unit 32a.

Figure 6:
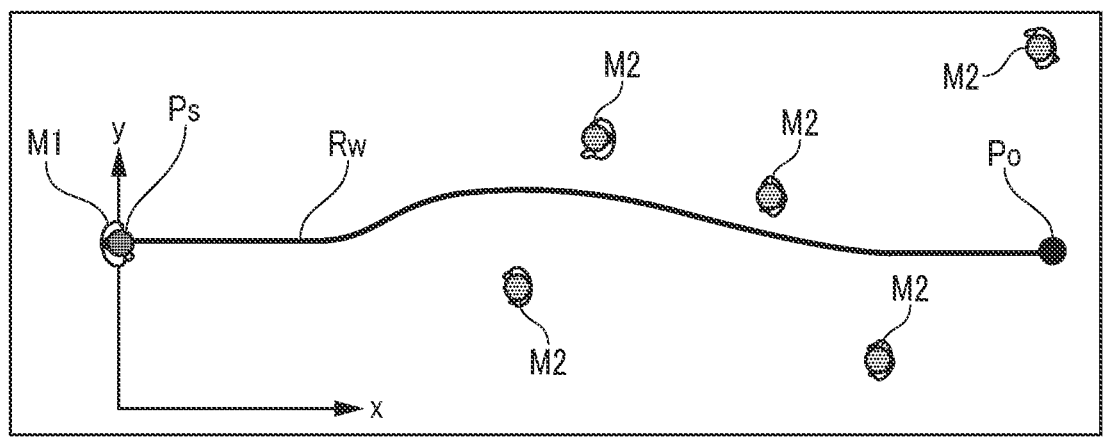
FIG. 6 is a diagram illustrating an example of a result of acquiring the walking trajectory.

Then, for example, the walking trajectory acquisition unit 32a sequentially samples and stores a walking trajectory Rw of the reference pedestrian M1 from the walking start point Ps to the destination Po as illustrated in FIG. 6 based on the measurement result of the LIDAR 31. As illustrated in FIG. 6, the walking trajectory Rw of the reference pedestrian M1 is acquired as a time series of two-dimensional x-y coordinate values when an axis extending in the moving direction of the reference pedestrian M1 is defined as an x axis and an axis orthogonal to the moving direction of the reference pedestrian M1 is defined as a y axis.

As described above, the walking trajectory acquisition unit 32a acquires the walking trajectory Rw of the reference pedestrian M1 in a state of being associated with the position of the nearby pedestrian M2 by the number of times the reference pedestrian M1 has walked from the walking start point Ps to the destination Po.

In addition, in the walking trajectory acquisition unit 32a, a movement direction command of the reference pedestrian M1 at the time of sampling is sequentially set at a predetermined control interval as a vector value having three directions including a "left direction", a "center direction", and a "right direction" as elements based on the measurement result of the LIDAR 31. In a case of the movement direction command, for example, when the reference pedestrian M1 is moving straight, the "center direction" is set to 1, and the "left direction" and "right direction" are set to 0.

When the reference pedestrian M1 is moving in the right direction, the "right direction" is set to 1, and the other directions are set to 0. In this case, the "right direction" is set to 1 when the reference pedestrian M1 moves rightward by a predetermined angle θ or more with respect to the straight movement direction. Further, when the reference pedestrian M1 is moving in the left direction, the "left direction" is set to 1, and the other directions are set to 0. In this case, the "left direction" is set to 1 when the reference pedestrian M1 moves leftward by the predetermined angle θ or more with respect to the straight movement direction.

Figure 7:
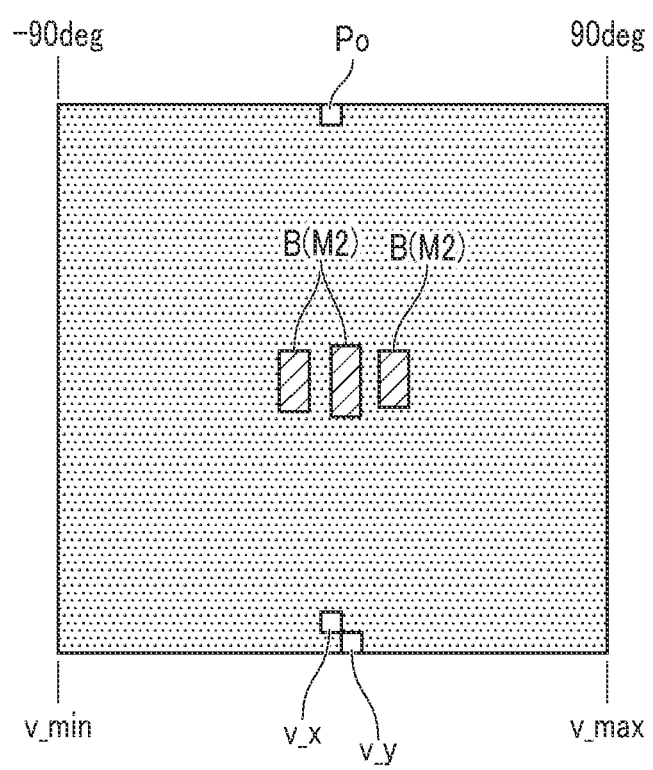
FIG. 7 is a diagram illustrating a mask image created by a mask image creation unit.

Meanwhile, the mask image creation unit 32b sequentially creates a mask image (see FIG. 7) at a predetermined control interval based on the result of acquiring the walking trajectory Rw by the walking trajectory acquisition unit 32*a* and the measurement result of the LIDAR 31. The mask image indicates the arrangement of the nearby pedestrians M2 present in the field of view of the reference pedestrian M1 in the moving direction. For example, when three nearby pedestrians M2 are present as illustrated in FIG. 7, the positions of these nearby pedestrians M2 are displayed as three rectangular boxes B. In FIG. 7, regions indicated by broken lines of the three boxes B are actually displayed in red, and the other regions indicated by dots are actually displayed in black. Note that, in the present embodiment, the time series of the mask image corresponds to a time series of positional relationship information of the plurality of second moving objects in a movement direction of the first moving object.

At the same time, the position of the destination Po at the time of measurement is displayed as a rectangular white box in an upper end portion of the mask image. The destination Po is set as a value within a range of −90 deg to 90 deg with the center position in front of the current self-position of the reference pedestrian M1 as a reference being 0 deg.

Furthermore, the x-axis speed v_x and the y-axis speed v_y of the reference pedestrian M1 at the time of sampling are displayed as two rectangular white boxes at a lower end of the mask image. The x-axis speed v_x and the y-axis speed v_y are speed components of the reference pedestrian M1 in an x-axis direction and a y-axis direction, respectively, and are set as values within a range of a minimum movement speed v min (for example, 0) and a maximum movement speed v max of the reference pedestrian M1.

Figure 8:
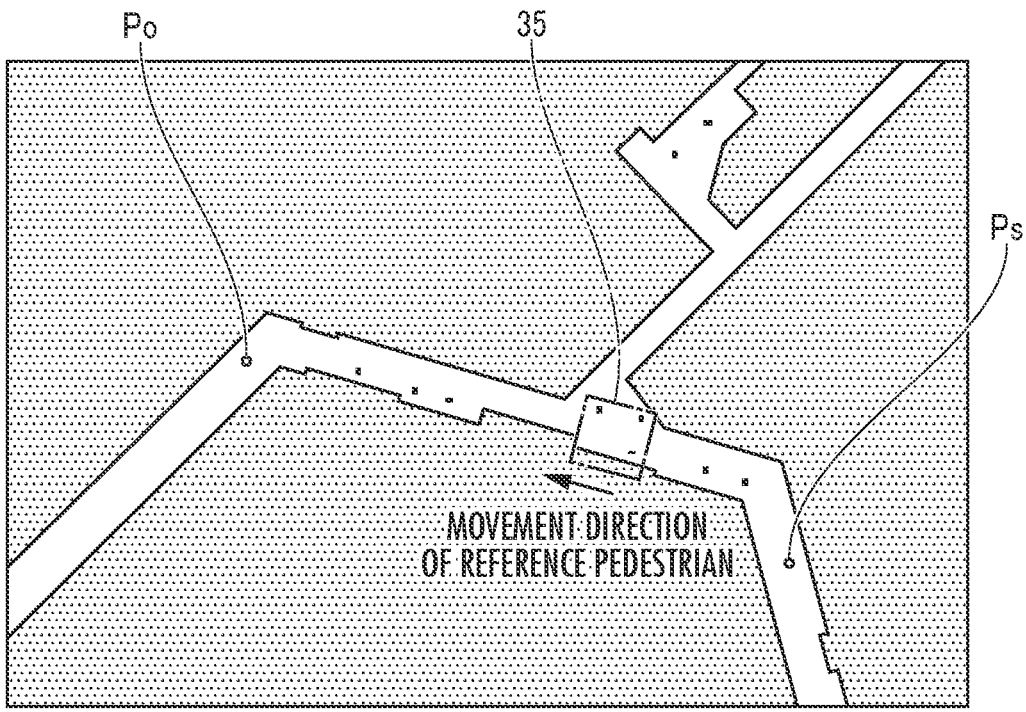
FIG. 8 is a diagram illustrating a map used for creating an environment information image by an environment information creation unit.

In addition, the environment information creation unit 32*c* sequentially creates an environment information image 35 (see FIG. 9) at a predetermined control interval based on the measurement result of the LIDAR 31 and a two-dimensional map illustrated in FIG. 8. The map of FIG. 8 represents an environment of a walking route from the walking start point Ps to the destination Po, and the environment information image 35, which is an image of a rectangular region having the position (not illustrated) of the reference pedestrian M1 at the time of sampling as the center, is cut out from the map of FIG. 8 and created as illustrated in FIG. 9.

Figure 9:
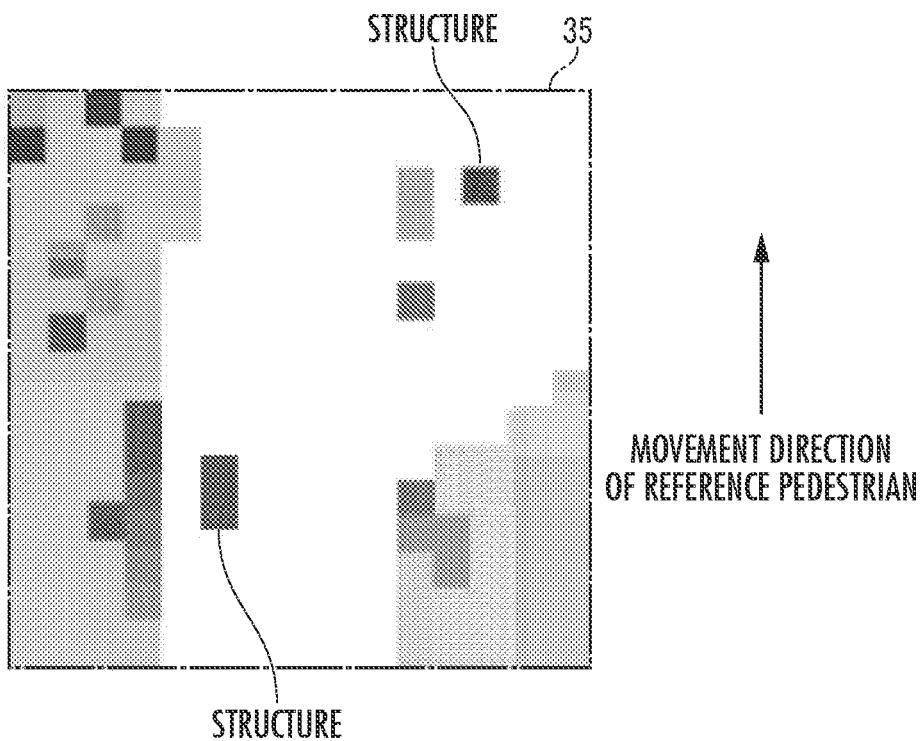
FIG. 9 is a diagram illustrating an environment information image created from the map of FIG. 8.

In FIG. 9, a blank portion is a region where no structure is present, that is, a passable region, and a black or gray region is a region where a structure such as a wall is present. In addition, a frame formed of a line with alternating long and short dashes illustrated in FIGS. 8 and 9 is added for easy understanding, and is not displayed in the actual environment information image 35.

Further, the learning data creation unit 32 creates a large number of learning data by linking the time series of the movement direction command of the reference pedestrian M1, the time series of the mask image, and a time series of the environment information image 35 acquired as described above, the time series being synchronized with each other. In this case, data in a case where the reference pedestrian M1 suddenly stops or is suddenly reversed, or the reference pedestrian M1 interferes with the nearby pedestrian M2 is inappropriate as the learning data, and thus is excluded from the learning data. These learning data are input from the learning data creation unit 32 to the CNN learning unit 33.

Figure 10:
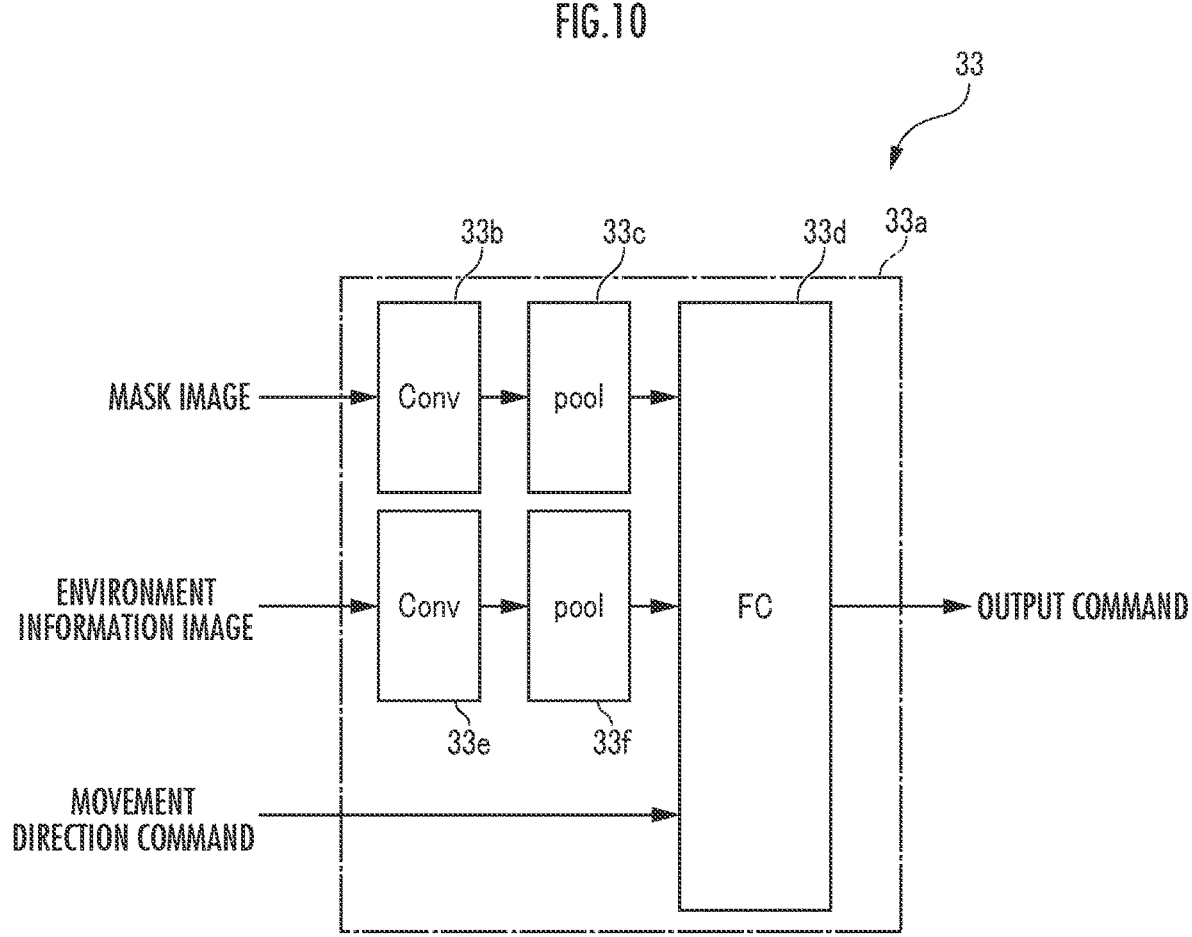
FIG. 10 is a block diagram illustrating a functional configuration of a CNN learning unit.

As illustrated in FIG. 10, the CNN learning unit 33 includes a CNN 33*a*, and the CNN 33*a* includes a plurality of sets of convolutional layers (indicated as Cony in FIG. 10) 33*b* and pooling layers (indicated as pool in FIG. 10) 33*c* (only one set is illustrated), a plurality of sets of convolutional layers 33*e* and pooling layers 33*f* (only one set is illustrated), and a fully connected layer (indicated as FC in FIG. 10) 33*d*.

That is, the CNN 33*a* has a multi-CNN structure in which two CNNs are combined, and the fully connected layer 33*d* includes a plurality of connected layers (not illustrated). Note that, in the present embodiment, the CNN 33*a* corresponds to the movement mode model.

In the CNN 33*a*, in a case where learning data is input from the learning data creation unit 32, the mask image of the learning data is input to the convolutional layer 33*b* as the uppermost layer of the CNN 33*a*, and thereafter, the output of the pooling layer 33*c* as the lowermost layer is input to the fully connected layer 33*d*.

Furthermore, the environment information image 35 is input to the convolutional layer 33*e* as the uppermost layer, and thereafter, the output of the pooling layer 33*f* as the lowermost layer is input to the fully connected layer 33*d*. Further, the movement direction command is also input to the fully connected layer 33*d*.

Then, the output of the pooling layer 33*c* as the lowermost layer, the output of the pooling layer 33*f* as the lowermost layer, and the movement direction command are connected in the fully connected layer 33*d*, such that the output command is output from the fully connected layer 33*d*. The output command has three labels ("left direction", "center direction", and "right direction") which are the same as those of the movement direction command, and is output as a value representing the probability of these labels.

The CNN learning unit 33 calculates the weight and the bias term of the fully connected layer 33*d* of the CNN 33*a* by a back propagation method using a loss function (for example, a mean squared error) of the movement direction command and the output command. That is, learning computation of the model parameter of the CNN 33*a* is performed. Then, by performing the above learning computation many times, the learning computation of the model parameter of the CNN 33*a* in the CNN learning unit 33 is terminated. In the learning device 30, the learning of the model parameter of the CNN 33*a* is performed as described above.

Next, a configuration of the trajectory determination device 1 of the present embodiment will be described with reference to FIG. 11. The trajectory determination device 1 determines (calculates) a movement speed command v as a trajectory of the robot 2 by the following method, and the movement speed command v includes, as elements, a target x-axis speed v_x_cmd and a target y-axis speed v_y_cmd that are target values of the x-axis speed v_x and the y-axis speed v_y of the robot 2.

Figure 11:
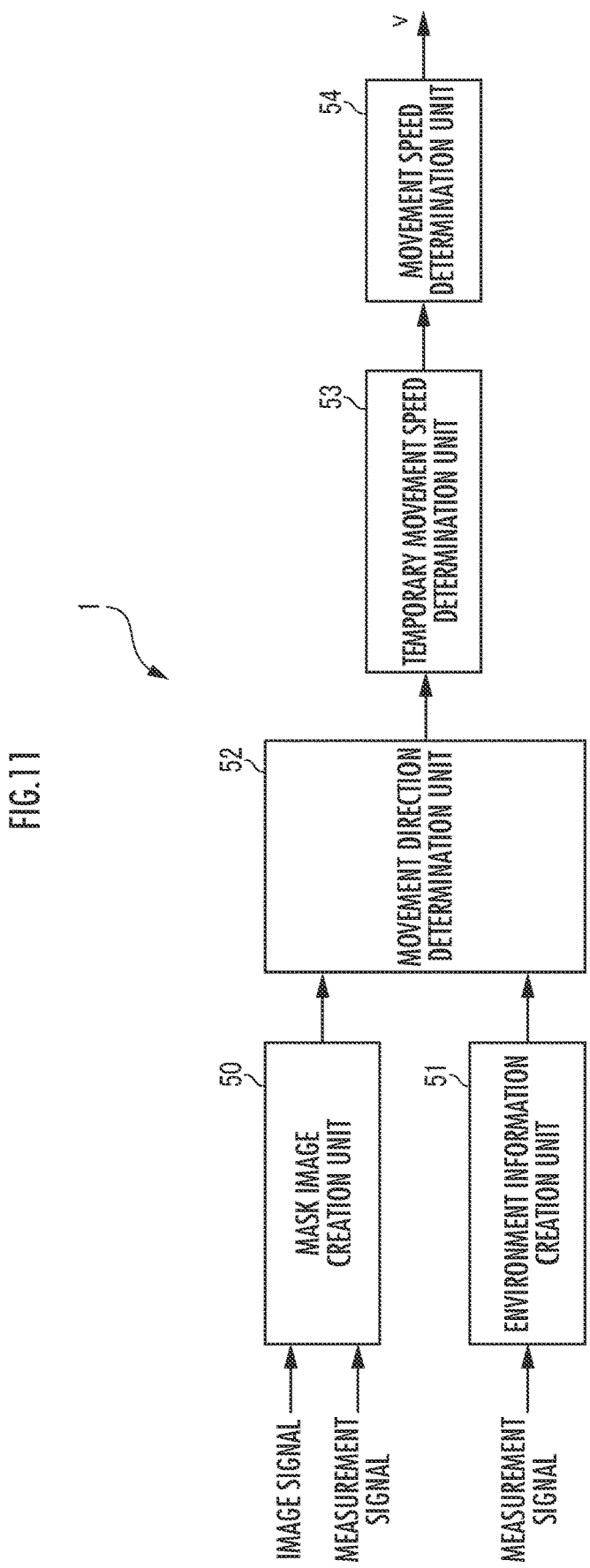
FIG. 11 is a diagram illustrating a functional configuration of a trajectory determination device.

As illustrated in FIG. 11, the trajectory determination device 1 includes a mask image creation unit 50, an environment information creation unit 51, a movement direction determination unit 52, a temporary movement speed determination unit 53, and a movement speed determination unit 54, and these elements 50 to 54 are specifically implemented by the control device 10.

First, the mask image creation unit 50 will be described. In the mask image creation unit 50, when the image signal from the camera 11 and the measurement signal from the LIDAR 12 are input, the mask image is created by a single shot multibox detector (SSD) method.

In the mask image, similarly to the boxes B of the mask image in FIG. 7 described above, a box (not illustrated) of a traffic participant including a preceding pedestrian is displayed, and the x-axis speed v_x and the y-axis speed v_y of the robot 2, and the destination Po (which are not illustrated) are displayed.

In this case, the position and the size of the traffic participant are determined based on the image signal of the camera 11 and the measurement signal of the LIDAR 12. The x-axis speed v_x and the y-axis speed v_y of the robot 2 are determined based on the measurement signal of the LIDAR 12 and the detection signal of the acceleration sensor 13. Furthermore, the destination Po is determined by the destination signal (not illustrated) from the server 5. The mask image created as described above is output from the mask image creation unit 50 to the movement direction determination unit 52.

In addition, in a case where a wireless signal from the server 5 is input, the environment information creation unit 51 creates the environment information image as described above based on position information of the robot 2 included in the wireless signal and the map data (FIG. 8) described above. The environment information image is output from the environment information creation unit 51 to the movement direction determination unit 52.

On the other hand, the movement direction determination unit 52 includes the CNN (not illustrated) of which a model parameter has been learned by the CNN learning unit 33 described above, and determines the movement direction of the robot 2 as follows using the CNN.

First, in the movement direction determination unit 52, when the mask image from the mask image creation unit 50 and the environment information image from the environment information creation unit 51 are input to the CNN, the above-described output command is output from the CNN. Next, the direction of the element having the maximum value among the three elements ("left direction", "center direction", and "right direction") of the output command is determined as the movement direction of the robot 2. The movement direction of the robot 2 determined as described above is output from the movement direction determination unit 52 to the temporary movement speed determination unit 53.

The temporary movement speed determination unit 53 calculates a temporary movement speed command v_cnn based on the movement direction of the robot 2 from the movement direction determination unit 52 and the x-axis speed v_x and the y-axis speed v_y of the robot 2. The temporary movement speed command v_cnn includes a temporary value v_x_cnn of the x-axis speed of the robot 2 and a temporary value v_y_cnn of the y-axis speed as elements. Subsequently, the temporary movement speed command v_cnn of the robot 2 determined as described above is output from the temporary movement speed determination unit 53 to the movement speed determination unit 54.

The movement speed determination unit 54 determines the movement speed command v by an algorithm to which a dynamic window approach (DWA) is applied based on the temporary movement speed command v_cnn. As described above, the movement speed command v includes the target x-axis speed v_x_cmd and the target y-axis speed v_y_cmd as elements.

In the trajectory determination device 1 of the present embodiment, the movement speed command v including the target x-axis speed v_x_cmd and the target y-axis speed v_y_cmd as elements is determined as described above. Then, the first and second actuators 24 and 25 are controlled so that the robot 2 moves according to the movement speed command v.

As described above, according to the model parameter learning method of the first embodiment, a large number of learning data are created by linking the time series of the movement direction command of the reference pedestrian M1, the time series of the mask image, and the time series of the environment information image, the time series being synchronized with each other. Further, the model parameter of the CNN 33a is learned by the back propagation method using these learning data.

In this case, since the time series of the movement direction command of the reference pedestrian M1, the time series of the mask image, and the time series of the environment information image are all acquired when the reference pedestrian M1 moves to the destination multiple times, the model parameter of the CNN 33a can be learned while reflecting information on the position of the structure positioned around the reference pedestrian M1 by learning the model parameter of the CNN 33a using these time series.

Therefore, in the trajectory determination device 1, when the movement direction of the robot 2 is determined using the CNN for which the learning has been completed as described above, the movement direction of the robot 2 can be determined so that interference with pedestrians and structures present around the robot 2 can be avoided even when the robot 2 moves to the destination in an environment where there are crowds and structures. In addition, since the environment information image is acquired as information on the two-dimensional map, when the movement direction of the robot 2 is determined using the movement mode model after learning, the movement direction can be determined using the two-dimensional map data stored in the robot 2.

Note that the first embodiment is an example in which the robot 2 is used as the moving device, but the moving device of the present invention is not limited thereto, and may be any moving device as long as it moves to a destination under a condition where a plurality of moving objects are present around the moving device. For example, a vehicle-type robot or a biped walking robot may be used.

Further, the first embodiment is an example in which the movement direction of the robot is used as the movement mode parameter, but the movement mode parameter of the present invention is not limited thereto, and may be any mode as long as it represents the movement mode when the moving device moves to a destination. For example, the movement speeds (vx and vy) of the robot may be used as the movement mode parameter. In this case, the CNN learning unit 33 may be configured to learn the model parameter of the CNN 33a whose output is the movement speed.

In addition, the first embodiment is an example in which the CNN is used as the movement mode model, but the movement mode model of the present invention is not limited thereto, and may be any model as long as image data is input and an action parameter is output. For example, a recurrent neural network (RNN), a deep Q-network (DQN), or the like may be used as the movement mode model.

Furthermore, the first embodiment is an example in which the back propagation method is used as the predetermined machine learning algorithm, but the predetermined machine learning algorithm of the present invention is not limited thereto, and may be any machine learning algorithm as long as it learns the model parameter of the movement mode model. For example, a support vector machine or the like may be used.

Further, although the first embodiment is an example in which the reference pedestrian M1 is used as a first moving object, the first moving object of the present invention is not limited thereto, and may be any moving object as long as it can move while avoiding interference with each of a plurality of second moving objects. For example, as the first moving object, an autonomous movement type robot may be used, or a vehicle capable of automatic driving may be used.

In addition, the first embodiment is an example in which the nearby pedestrian M2 is used as the second moving object, but instead, an autonomous movement type robot, a vehicle capable of automatic driving, an animal, or the like may be used as the second moving object.

Further, the moving object of the present invention may be a pedestrian, an autonomous movement type robot, a vehicle capable of automatic driving, an animal, or the like.

Next, a model parameter learning method according to a second embodiment of the present invention will be described. Since the model parameter learning method of the present embodiment is the same as the model parameter learning method of the first embodiment except for a part thereof, different points will be mainly described below. The same components as those of the first embodiment are denoted by the same reference signs, and a description thereof will be omitted.

First, the present embodiment is different from the above-described embodiment in that data created by a learning data creation unit 32 is different, and a CNN learning unit 33A (see FIG. 16) to be described later is provided instead of the above-described CNN learning unit 33.

In the learning data creation unit 32 of the present embodiment, an environment information creation unit 32c creates an environment optical flow 63 (see FIG. 15) as described below instead of the environment information image 35 described above. The environment optical flow 63 represents information on a structure around the reference pedestrian M1 at the time of sampling.

Figure 12:
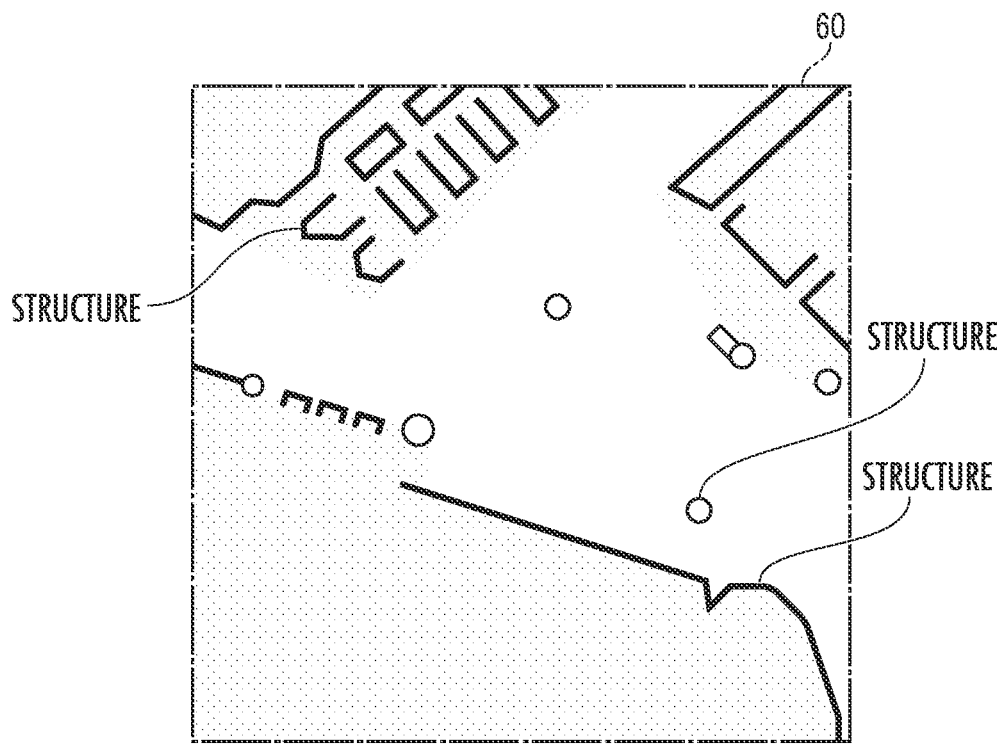
FIG. 12 is a map image used for creating an environment optical flow.
Figure 13:
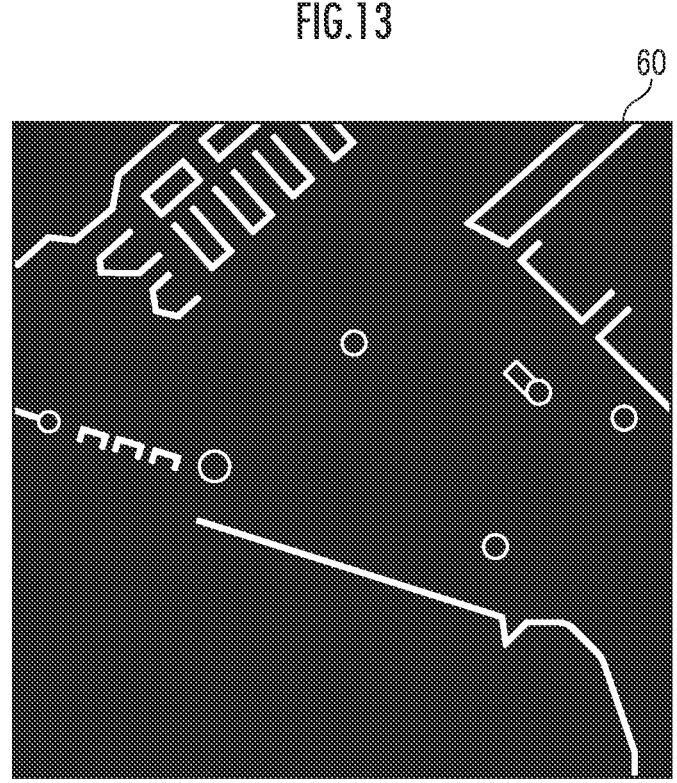
FIG. 13 is a diagram obtained by performing binarization and edge detection processing on FIG. 12.
Figure 14:
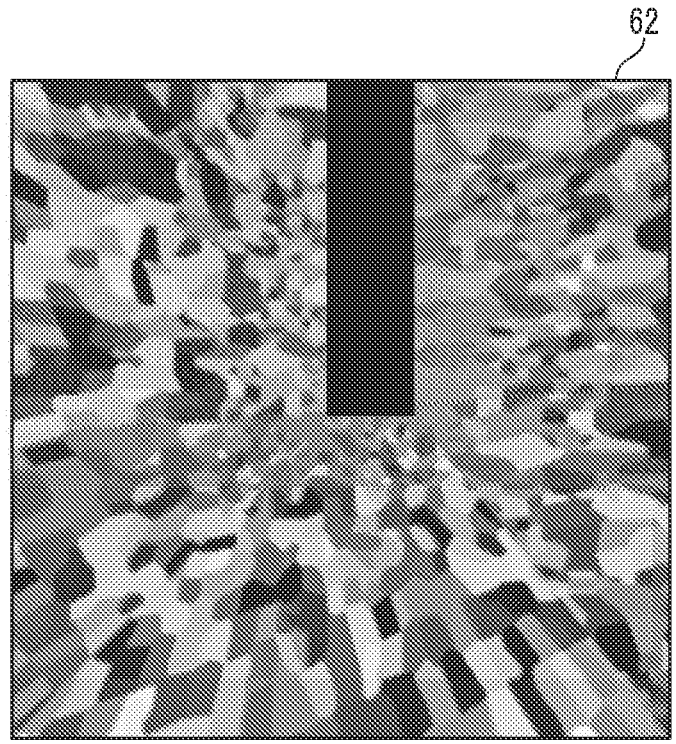
FIG. 14 is a diagram illustrating a virtual image created from FIG. 13.

First, an image 60 illustrated in FIG. 12 is cut out from the map of FIG. 8 described above as an image of a rectangular region having the position (not illustrated) of the reference pedestrian M1 at the time of sampling as the center. Next, a black region in the image 60 of FIG. 12 is regarded as a structure (obstacle), and in order to extract a boundary of this region, the black region of the image 60 and other regions are binarized and subjected to edge detection processing, whereby an image 61 illustrated in FIG. 13 is acquired. Then, the position of the structure such as the wall is acquired in a map coordinate system based on edge information of FIG. 13, and a virtual image 62 illustrated in FIG. 14 is created. The virtual image 62 corresponds to a virtual image in which a random rectangular pattern is attached on a wall surface and a road surface in front of the reference pedestrian M1 at the time of sampling.

Figure 15:
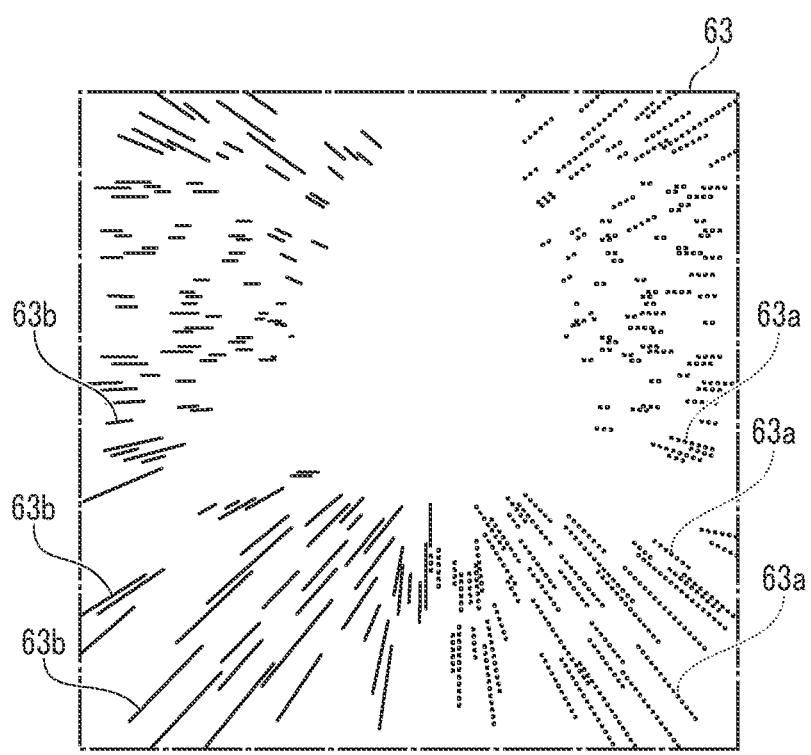
FIG. 15 is a diagram illustrating an environment optical flow created from FIG. 14.

Next, optical flow calculation processing is executed on the virtual image 62 illustrated in FIG. 14, thereby creating the environment optical flow 63 illustrated in FIG. 15. As illustrated in FIG. 15, in a case of the environment optical flow 63, a large number of optical flows 63a and 63b representing environment information are included. A large number of optical flows 63a indicate the same position in the map coordinate system, and a large number of optical flows 63b indicate the same position in the map coordinate system that is different from that of a large number of optical flows 63a. In addition, a frame formed of a line with alternating long and short dashes in FIG. 15 is displayed for easy understanding. The environment information creation unit 32c creates the environment optical flow 63 as described above.

Furthermore, in the present embodiment, the above-described learning data creation unit 32 creates a large number of learning data by linking the time series of the movement direction command of the reference pedestrian M1, the time series of the mask image, and a time series of the environment optical flow 63, the time series being synchronized with each other. Then, these learning data are input from the learning data creation unit 32 to the CNN learning unit 33A (see FIG. 16).

As illustrated in FIG. 16, the CNN learning unit 33A includes a CNN 33a configured similarly to the CNN learning unit 33 in FIG. 10 described above. That is, the CNN 33a has a multi-CNN structure in which two CNNs are combined.

In the CNN learning unit 33A, in a case where learning data is input from the learning data creation unit 32, as described above, the mask image of the learning data is input to a convolutional layer 33b as the uppermost layer of the CNN 33a, and thereafter, the output of a pooling layer 33c as the lowermost layer is input to a fully connected layer 33d.

Furthermore, the environment optical flow of the learning data is input to a convolutional layer 33e as the uppermost layer, and thereafter, the output of a pooling layer 33f as the lowermost layer is input to the fully connected layer 33d. Further, the movement direction command is also input to the fully connected layer 33d. Then, the outputs of the pooling layers 33c and 33f as the lowermost layers and the movement direction command are connected in the fully connected layer 33d, such that an output command is output from the fully connected layer 33d.

Then, similarly to the CNN learning unit 33 described above, the CNN learning unit 33A calculates the weight and the bias term of the fully connected layer 33d by the back propagation method using a loss function (for example, a mean squared error) of the movement direction command and the output command. In a learning device 30, learning of model parameters of two CNNs is performed as described above.

Meanwhile, in the present embodiment, in the environment information creation unit 51 of the trajectory determination device 1 described above, the environment optical flow 63 is created based on the image signal from the camera 11, and the environment optical flow 63 is output from the environment information creation unit 51 to the movement direction determination unit 52. Then, the movement direction determination unit 52 determines the movement direction of the robot 2 by the above-described method using the two CNNs of which model parameters have been learned by the CNN learning unit 33A described above.

As described above, according to the model parameter learning method of the second embodiment, since the learning of the model parameters of the two CNNs is performed, it is possible to obtain the same effects as those of the model parameter learning method of the first embodiment. In addition, in the trajectory determination device 1, in a case where the movement direction of the robot 2 is determined using the two CNNs for which the learning of the model parameters has been completed, the image signal of the camera 11 of the robot 2 can be used.

Note that the environment information creation unit 32c of the learning data creation unit 32 according to the second embodiment may create the environment optical flow by a method described below instead of the creation method described above. For example, the robot 2 may be moved along the movement trajectory of the reference pedestrian M1 under the condition that the nearby pedestrian M2 is not present, and the environment optical flow may be created from the image captured by the camera 11 of the robot 2 at that time. Alternatively, a pedestrian wearing a camera may be moved along the movement trajectory of the reference pedestrian M1 under the condition that the nearby pedestrian M2 is not present, and the environment optical flow may be created from an image captured by the camera at that time.

Reference Signs List

1 Trajectory determination device (movement mode parameter determination device)
2 Robot (moving device)
30 Learning device
32 Learning data creation unit (learning data creation step)
32*a* Walking trajectory acquisition unit (movement mode parameter acquisition step)
32*b* Mask image creation unit (positional relationship information acquisition step)
32*c* Environment information creation unit (environment information acquisition step)
33 CNN learning unit (learning step)
33*a* CNN (movement mode model)
35 Environment information image (environment information)
Ps Departure point
Po Destination
M1 Reference pedestrian (first moving object)
M2 Nearby pedestrian (second moving object)

What is claimed is:

1. A trajectory determination method, comprising:
a model parameter learning step in which a learning device learns a model parameter of a movement mode model for determining a movement mode parameter representing a movement mode when an autonomously moving robot moves from a departure point to a destination under a condition that a plurality of moving objects are present around the robot, the model parameter learning step performed by the learning device comprising:
   a movement mode parameter acquisition step of acquiring a time series of the movement mode parameter of a first moving object when the first moving object moves from the departure point to the destination while avoiding interference with each of a plurality of second moving objects under a condition that the plurality of second moving objects are present around the first moving object;
   a positional relationship information acquisition step of acquiring a time series of positional relationship information of the plurality of second moving objects in a movement direction of the first moving object when the first moving object moves from the departure point to the destination;
   an environment information acquisition step of acquiring a time series of environment information which is information indicating an extension state of a stationary object around the first moving object when the first moving object moves from the departure point to the destination;
   a learning data creation step of creating learning data by associating the time series of the movement mode parameter, the time series of the positional relationship information synchronized with the time series of the movement mode parameter, and the time series of the environment information synchronized with the time series of the movement mode parameter with each other; and
   a learning step of learning the model parameter of the movement mode model, which outputs the movement mode parameter, by a predetermined machine learning algorithm using the learning data as an input to the movement mode model; and
determining, by a trajectory determination device, a trajectory of the autonomously moving robot by using the movement mode model of which the model parameter is learned in the model parameter learning step.

2. The trajectory determination method according to claim 1, wherein
in the environment information acquisition step, the environment information is acquired as information on a two-dimensional map.

3. The trajectory determination method according to claim 1, wherein
in the environment information acquisition step, the environment information is acquired as an optical flow.

\* \* \* \* \*